United States Patent
Murakami et al.

(10) Patent No.: US 6,307,985 B1
(45) Date of Patent: Oct. 23, 2001

(54) OPTICAL TRANSMISSION SYSTEM

(75) Inventors: Makoto Murakami; Hideki Maeda; Takamasa Imai, all of Yokohama (JP)

(73) Assignee: Micro Therapeutics, Inc., Irvine, CA (US)

( * ) Notice: Subject to any disclaimer, the term of this patent is extended or adjusted under 35 U.S.C. 154(b) by 0 days.

(21) Appl. No.: 09/348,838

(22) Filed: Jul. 8, 1999

(30) Foreign Application Priority Data

Jul. 10, 1998 (JP) .................................................. 10-196364

(51) Int. Cl.[7] ....................................................... G02B 6/02
(52) U.S. Cl. .............................. 385/24; 385/15; 359/109; 359/161; 359/173
(58) Field of Search ........................ 385/24, 15; 359/109, 359/161, 173

(56) References Cited

U.S. PATENT DOCUMENTS 5,764,841 * 6/1998 Iwatsuki et al. ...................... 385/123

FOREIGN PATENT DOCUMENTS

| 09023187 A | 1/1997 | (JP) | ............................... H04B/10/02 |
| 10039154 A | 2/1998 | (JP) | ................................ G02B/6/16 |
| 10039155 A | 2/1998 | (JP) | ................................ G02B/6/16 |
| 10073738 A | 3/1998 | (JP) | ................................ G02B/6/16 |

OTHER PUBLICATIONS

Maeda, H. et al., "10 Gbit/s/ch WDM Transmission Systems using Dispersion Management–Dispersion Compensation under Optical Fiber Nonlinear Effects," The Institute of Electronics, Information, and Communication Engineers, Technical Report of IEICE, OCS96–57, OPE96–107, LQE96–108(Nov. 1996): 37–42.

Naka, A. et al., "In–line Amplifier Transmission Distance Determined by Self–Phase Modulation and Group–Velocity Dispersion," Journal of Lightwave Technology, vol. 12, No. 2, Feb. 1994: 280–287.

10–221562: Lucent Technologies, Inc.

Murakami, M. et al., "Long–Haul 16X10 WDM Transmission Experiment Using Higher Order Fiber Dispersion Management Technique," ECOC, Sep. 20–24, 1998: 313–314.

Murakami, M. et al., "Quarter Terabit (25X10 Gb/s) Over 9288 km WDM Transmission Experiment Using Nonlinear Supported RZ Pulse In Higher Order Fiber Dispersion Managed Line," ECOC, Sep. 20–24, 1998: 79–81.

* cited by examiner

*Primary Examiner*—Ellen E. Kim
(74) *Attorney, Agent, or Firm*—Burns Doane Swecker & Mathis LLP (57) ABSTRACT

It is the objective of the present invention to resolve the limitations on transmission capacity and distance in a system by means of a simple design, through the provision of a means for restraining the deterioration in transmission characteristics that is the result of accumulation over the entire system of third order dispersion in the optical fiber. In the present invention, there is provided an optical fiber transmission path in which positive dispersion fibers 40,46,52, and 54 and negative dispersion fibers 42,48 (referred to as optical fibers hereinafter), which have at least second and third order dispersion of mutually opposite signs, are combined. In addition, the optical fiber is disposed so that the average third order dispersion value on the transmission path overall is reduced, and so the length of each optical fiber is sufficiently smaller than the square root of the product of the second order dispersion length, which is determined from the second order dispersion value of the optical fiber and the pulse width of the signal, and the non-linear length, which is determined from the average power of the signal within the optical fiber and the optical fiber nonlinear coefficient.

10 Claims, 7 Drawing Sheets

OPTICAL TRANSMISSION SYSTEM

BACKGROUND OF THE INVENTION

1. Field of the Invention

The present invention relates to an optical transmission system for transmitting optical signals using optical fiber.

2. Background Art

Taking into consideration damping and the like of the optical signal in optical communications, it is necessary to increase the optical signal output power in order to increase the distance over which the optical signal can be transmitted. It is known, however, that when the output of the optical signal which is propagating through the fiber and the transmission distance are increased, then the non-linear effect become notable in the optical fiber that is typically employed as the optical transmission path. As a result, this non-linear effect limits the transmission distance which is possible in an optical transmission system.

It is generally known that optical fiber non-linearity typically causes the phenomenon described below.

(1) Self-phase modulation which brings about a phase change in the signal light itself in response to a change in light intensity (2) Four-wave mixing which causes mutual interaction between signal light of different wavelengths or between signal light and noise light (3) cross-phase modulation The phenomenon caused by optical fiber nonlinearity is disclosed in detail in G. P. Agrawal (Ed.), Nonlinear Fiber Optics, Academic Press, for example.

The self-phase modulation effect described above expands the spectrum of the signal light itself, therefore increasing the deterioration in the signal light waveform due to chromatic dispersion in the optical fiber. Chromatic dispersion in the optical fiber which is the cause of this waveform deterioration typically means second order dispersion or higher.

In other words, taking into consideration only the self-phase modulation effect, when desiring to reduce or prevent this effect, it is acceptable to transmit the optical signal at the zero dispersion wavelength of the optical fiber.

On the other hand, four-wave mixing and cross-phase modulation depend on the difference in group velocity between optical signals of differing wavelengths or between the optical signal and light noise. The size of the interaction becomes smaller as the difference in group velocity becomes larger. This difference in group velocity is roughly proportional to the second order dispersion value, so that the second order dispersion value may be made large in order to reduce the four-wave mixing and cross-phase modulation effects. A conventional transmission path for satisfying these reciprocal conditions is arranged as shown in FIG. 7.

Figure 7:
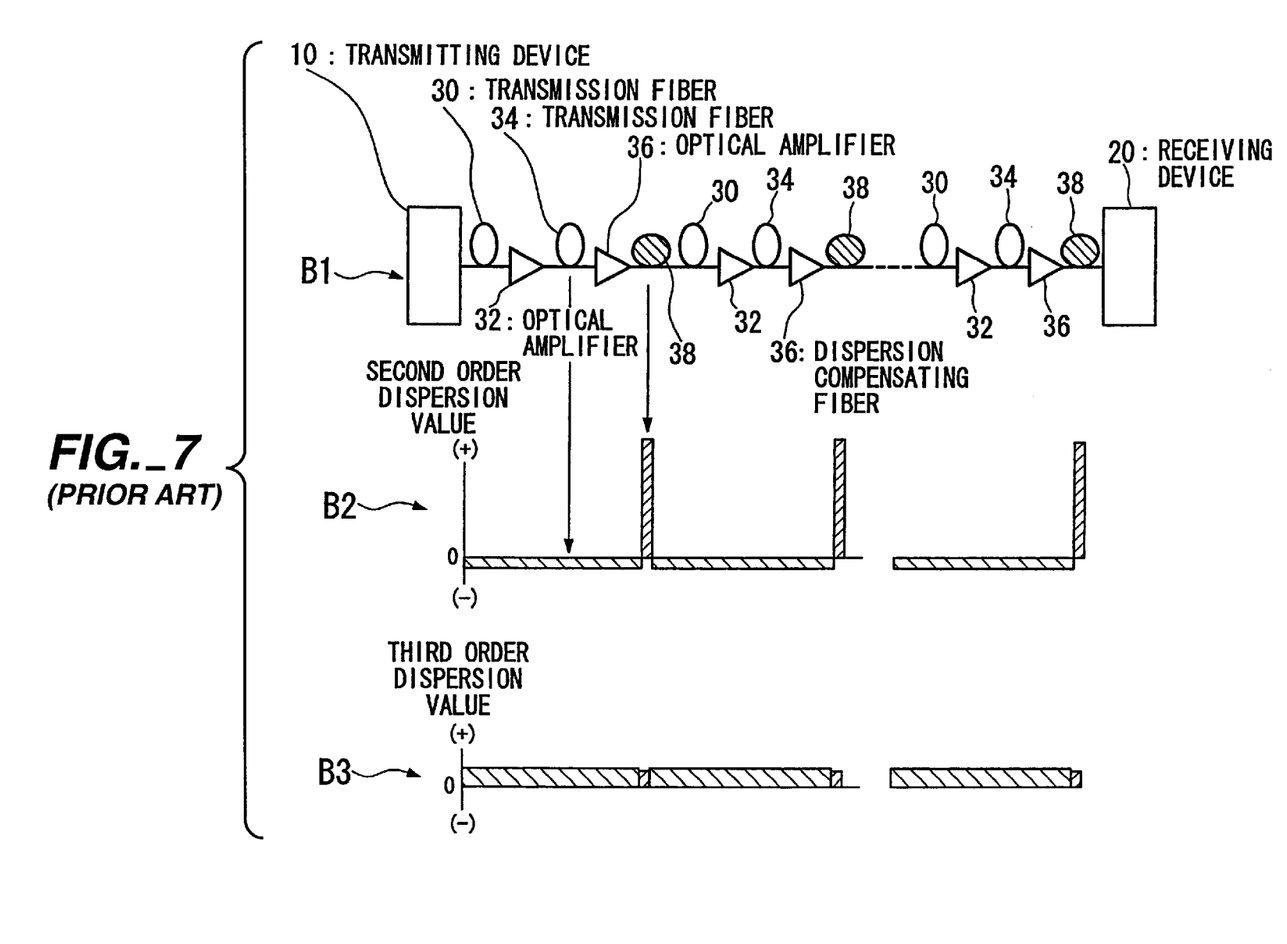
FIG. 7 is a diagram showing the arrangement of a conventional transmission path, wherein B1 shows the physical arrangement of the transmission path, B2 shows the distribution of the second order dispersion value of the transmission path shown in B1, and B3 shows the distribution of the third order dispersion value of the transmission path shown in B1.

FIG. 7 is a diagram showing the arrangement of a conventional transmission path. B1 shows the physical arrangement of the transmission path, B2 shows the distribution of the second order dispersion values of the transmission path shown in B1, and B3 shows the distribution of the third order dispersion values of the transmission path shown in B1.

In the conventional transmission path provided between transmitting device 10 and receiving device 20, unit transmission paths consisting of transmitting fiber 30, optical amplifier 32, transmission fiber 34, optical amplifier 36 and dispersion compensating fiber 38 are connected in a cascade.

Second order dispersion is not zero in transmission fibers 30,34, but rather has a negative dispersion value in the example shown in FIG. 7. In addition, dispersion compensating fiber 38 is for compensating for the dispersion caused when the optical signal is propagated through transmission fibers 30,34, and has a positive second order dispersion value in the example shown in FIG. 7.

Thus, in this way, it has been the conventional practice to employ a combination of optical fibers 30,34 in which the second order dispersion is not zero, and a dispersion compensating fiber 38 which is inserted into each given transmission path so that the second order dispersion value becomes zero.

However, the conventional optical transmission system takes into consideration only the second order dispersion value and is designed to make this second order dispersion value zero. Therefore, the third and higher dispersion possessed by optical fibers which are typically employed does not become zero. In the example shown in FIG. 7, an examination of the third order dispersion value, for example, reveals that transmission fiber 30, transmission fiber 34 and dispersion compensating fiber 38 all have third order dispersion values which are positive, with this dispersion being uncompensated.

For this reason, as a result, the optical signal which has propagated along the transmission path is effected by the third or higher dispersion possessed by the optical fiber. Because conventional optical systems do not take third and higher order dispersion into consideration at all, the entire transmission path is effected.

When the non-linearity of the optical fiber during signal propagation cannot be ignored, a deterioration in the signal waveform occurs, even if a device for compensating for this dispersion is inserted between transmitting device 10 and receiving device 20.

Of the higher order dispersion discussed above, the third order dispersion is particularly problematic as its dispersion value is relatively the largest in comparison with higher order dispersion. Moreover, when the third order dispersion is not zero, then the second order dispersion value differs according to the wavelength.

Figure 8:
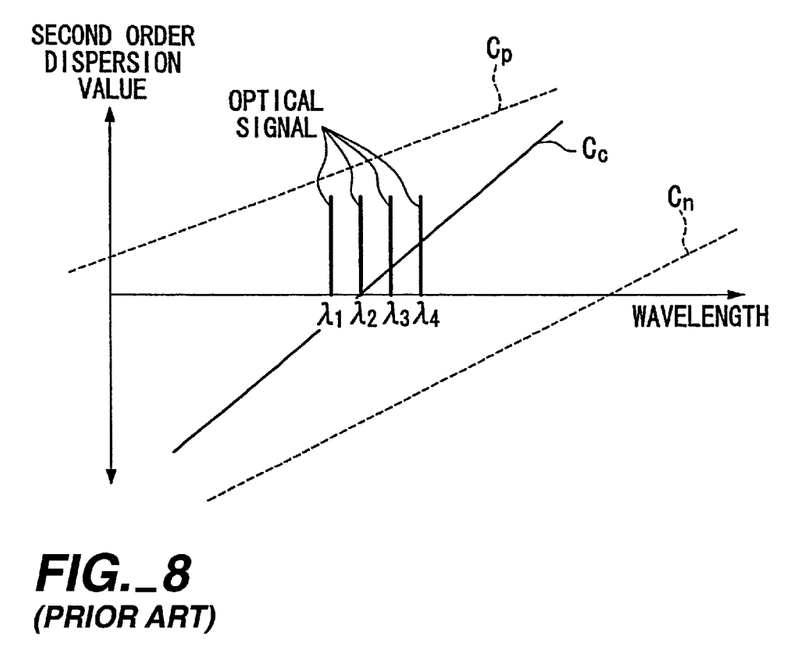
FIG. 8 is a diagram for explaining the relationship between dispersion characteristics and a signal of multiplexed wavelengths in a conventional optical transmission system.

FIG. 8 is a diagram for explaining the relationship between dispersion characteristics and a signal of multiplexed wavelengths in a conventional optical transmission system.

In FIG. 8, the line denoted by symbol $C_p$ shows the relationship between the second order dispersion value and the wavelength of dispersion compensating fiber 38 in FIG. 7. The line denoted by $C_n$ shows the relationship between the second order dispersion value and the wavelength of the transmission fibers 30,34 in FIG. 7. The line denoted by $C_c$ shows the relationship between the second order dispersion value and the wavelength when transmission fibers 30,34 and dispersion compensating fiber 38 in FIG. 7 are combined.

When carrying out a transmission of multiplexed wavelengths using wavelengths $\lambda_1$, $\lambda_2$, $\lambda_3$, and $\lambda_4$ as shown in FIG. 8, it is possible to render the second order dispersion value to be zero with respect to the optical signal of a given wavelength ($\lambda_2$ in the example shown in FIG. 8). However, it is not possible to render the second order dispersion values with respect to the other signal wavelengths ($\lambda_1$, $\lambda_3$, and $\lambda_4$ in the example shown in FIG. 8) to be zero.

As a result, when the signals of these other wavelengths (($\lambda_1$, $\lambda_3$, and $\lambda_4$ in the example shown in FIG. 8) are propagated along the transmission path, dispersion occurs. Moreover, because this dispersion on the transmission path is not compensated, second order dispersion accumulates over the entire system.

When optical fiber non-linearity with respect to the propagating optical signal cannot be ignored, a deterioration in the signal waveform occurs, even if dispersion compensation is performed at transmitting device 10 or receiving device 20.

SUMMARY OF THE INVENTION

The present invention was conceived in consideration of the above-described circumstances and has as its objective the provision of an optical transmission system which resolves the limitations on transmission capacity and transmission distance in a system by means of a simple design, through the provision of a means for restraining the deterioration in transmission characteristics that is the result of accumulation over the entire system of third order dispersion in the optical fiber in an optical transmission system.

In order to resolve the above described problems, the present invention is characterized in the provision of an optical fiber transmission path in which optical fibers which have at least second and third order dispersion of mutually opposite signs are combined, and in that the optical fibers are disposed so that the average third order dispersion value on the transmission path overall is reduced, and so the length of each optical fiber is sufficiently smaller than the square root of the product of the second order dispersion length, which is determined from the second order dispersion value of the optical fiber and the pulse width of the signal, and the non-linear length, which is determined from the average power of the signal within the optical fiber and the optical fiber nonlinear coefficient of the optical fiber.

In addition, the present invention is further characterized in that the average second order dispersion value on the optical fiber transmission path maintains a finite value in an interval of a distance which is sufficiently longer than the coherence length and the walk-off length, which are determined from the second order dispersion value, the signal pulse width and the wavelength interval between each signal in a signal of multiplexed wavelengths, and in that the optical fiber is disposed so that the second order dispersion value becomes zero in the interval which is smaller than the square root of the product of the second order dispersion length determined by the second order dispersion value and the signal pulse width, and the non-linear length which is determined from the average power of the signal within the optical fiber and the nonlinear coefficient of the optical fiber.

The present invention is further characterized in the provision of an optical amplifier which operates as an optical repeater, wherein, in the combination of optical fibers, an optical fiber with a small nonlinear coefficient is disposed to the output side of the optical amplifier.

The present invention is further characterized in that the lengths of the optical fiber having positive sign second and third order dispersion, and the length of the optical fiber having the negative sign second and third order dispersion are equal.

The present invention is further characterized in that the transmission path has forward and reverse lines, and is provided with a common interval in which the second order dispersion value with respect to the forward line and the reverse line is compensated for to be zero.

The present invention is further characterized in that the optical fibers at either end of the transmission path are at least 20 kilometers or greater in length and in that the forward and the reverse lines are the same type of optical fiber.

The present invention employs a combination of optical fibers having second and third order dispersion of mutually opposite signs as the optical fiber transmission path. By adjusting the parameters of and disposing these optical fibers, the deterioration in transmission characteristics which is caused by optical fiber non-linearity and optical fiber dispersion characteristics is sufficiently reduced.

In the optical transmission system according to this invention, the fundamental light transmitter/receiver and repeater transmission functions are realized by means of optical transmitting and receiving devices, optical fiber transmission path, and optical amplifier and repeater in the same manner as the conventional practice. By designing this optical fiber transmission path using a combination of second and third order dispersion having mutually opposite signs, it is possible to avoid the accumulation of third order dispersion over the entire system. At the same time, the disposition of the second order dispersion value is managed so as to reduce the signal deterioration that is caused by self-phase modulation, cross-phase modulation, and four wave mixing. Thus, the effect therefrom can be prevented in the same way as in the conventional systems which managed only the second order dispersion value. The present invention enables a significant easing of the deterioration in transmission characteristics that is caused by optical fiber non-linearity and optical fiber dispersion characteristics. Thus, the present invention is effective in increasing the system capacity and the transmission distance.

In the actual construction, in the case where the length of the optical fiber having positive sign second and third order dispersions and the length of the optical fiber having negative sign second and third order dispersions are equal, and there are forward and reverse lines, a common interval is provided in which the second order dispersion value with respect to the forward and reverse lines is compensated for to be zero. For this reason, the construction and maintenance when actually laying the transmission path are easy. Moreover, the same type of optical fiber, which is at least 20 kilometers or more in length, is employed for the forward and reverse lines in the optical fibers at either end of the transmission path. Thus, maintenance is easily and rapidly carried out.

BRIEF DESCRIPTION OF THE INVENTION

DETAILED DESCRIPTION OF THE PREFERRED EMBODIMENT

The optical transmission system according to embodiments of the present invention will now be explained in detail with reference to the accompanying figures.

Figure 1:
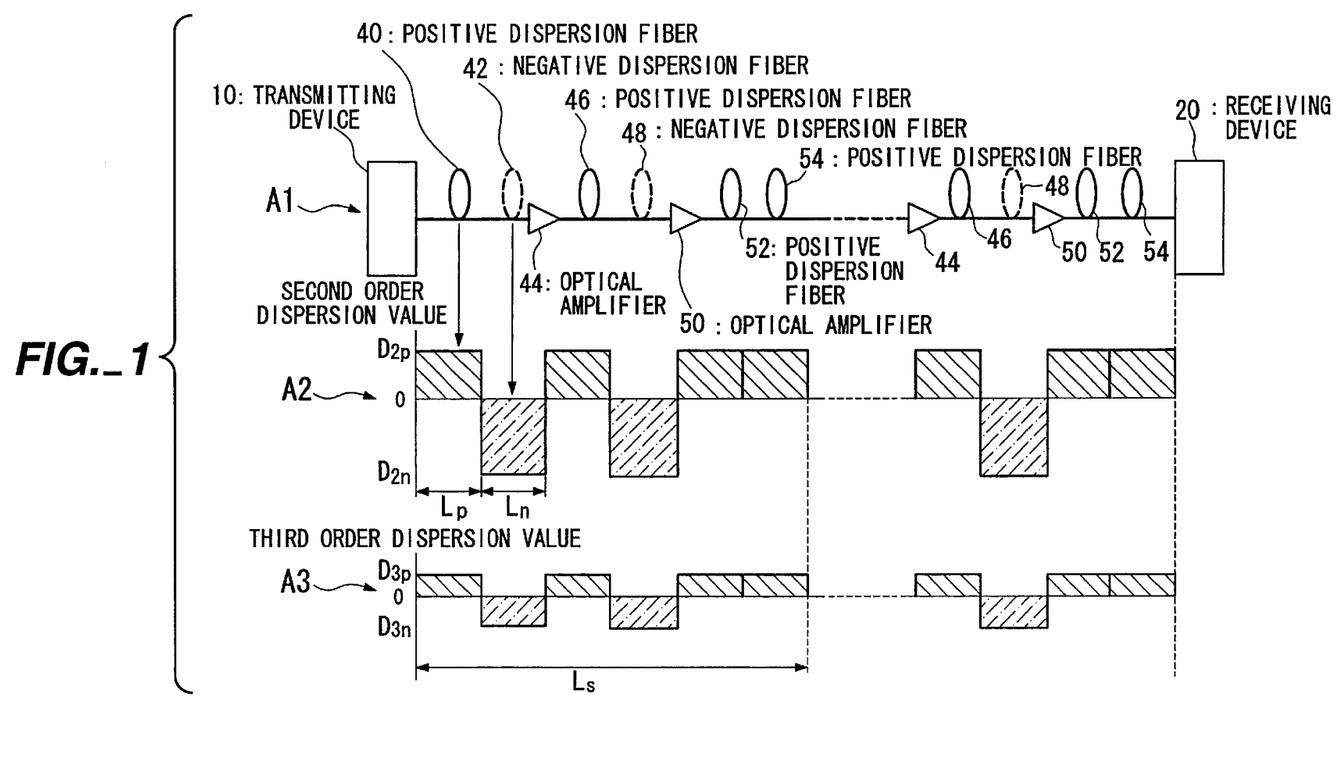
FIG. 1 is a block diagram showing the structure of an optical transmission system according to one embodiment of the present invention, wherein A1 shows the physical arrangement of the transmission path, A2 shows the distribution of the second order dispersion values on the transmission path shown in A1, and A3 shows the distribution of the third order dispersion value on the transmission path shown in A1.

FIG. 1 is a block diagram showing the structure of an optical transmission system according to one embodiment of the present invention, wherein A1 shows the physical arrangement of the transmission path, A2 shows the distribution of the second order dispersion values on the transmission path shown in A1, and A3 shows the distribution of the third order dispersion values on the transmission path shown in A1.

In this embodiment, transmitting device 10 generates an optical signal of a single wavelength or of multiplexed wavelengths. In the transmission path that is provided between transmitting device 10 and receiving device 20, unit transmission paths consisting of positive dispersion fiber 40, negative dispersion fiber 42, optical amplifier 44, positive dispersion fiber 46, negative dispersion fiber 48, optical amplifier 50, positive dispersion fiber 52 and positive dispersion fiber 54, are connected in cascade.

Positive dispersing optical fibers 40, 46, 52, and 54 have positive sign second and third order dispersion, while the negative dispersion fibers 42 and 48 have negative sign second and third order dispersion.

The length of positive dispersing optical fibers 40, 46, 52, and 54 is $L_p$, while that of negative dispersion fibers 42 and 48 is $L_n$.

The second and third order dispersion of positive dispersing optical fibers 40, 46, 52, and 54 are designated as $D_{2p}$ and $D_{3p}$, respectively, while the second and third order dispersion of negative dispersion fibers 42 and 48 are designated as $D_{2n}$ and $D_{3n}$, respectively.

The intervals in which positive dispersion fibers 40, 46, 52, and 54 and negative dispersion fibers 42 and 48 are combined, i.e., the average second order dispersion value and average third order dispersion value of the unit transmission path, are designated as $D_{2s}$ and $D_{3s}$, respectively. The total length of the system is indicated as L.

When considering the transmission of a typical signal of multiplexed wavelengths, the average power per wavelength signal in the optical fiber is designated as P, the optical fiber nonlinear coefficient is designated as $k_2$, the signal pulse width is designated as $T_0$, the signal optical wavelength is designated as $\lambda$ (approximately common to all signal wavelengths), and the wavelength interval is designated as $\Delta\lambda$. Thereafter, the characteristic lengths expressed by the following formulas (1)-(5) may be defined.

$$L_{NL} = \frac{1}{k_2 P} \tag{1}$$

$$L_{D2} = \frac{T_0^2}{\left(\frac{\lambda^2}{2\pi c}\right)|D_2|} \tag{2}$$

$$L_{D3} = \frac{T_0^3}{\left(\frac{\lambda^2}{2\pi c}\right)\left|\frac{2D_2}{\lambda} + D_3\right|} \tag{3}$$

$$L_w = \frac{T_0}{|D_2|\Delta\lambda} \tag{4}$$

$$L_{coh} = \frac{1}{\left(\frac{2\pi c}{\lambda^2}\right)|D_2|\Delta\lambda^2} \tag{5}$$

$L_{NL}$ is the non-linear length, and is the scale for the non-linearity of the optical fiber. $L_{D2}$ and $L_{D3}$ are the second and third order dispersion lengths, respectively, and are the scales for the size of the second and third order dispersions.

Note that for simplicity, $D_2$ in the equations (2) through (5) may indicate either $D_{2p}$, $D_{2n}$, or $D_{2s}$.

Similarly, $D_3$ in the equations (2) through (5) may indicate either $D_{3p}$, $D_{3n}$, or $D_{3s}$. Note that the expression "pulse width" as employed in this specification may be defined as the full width at half maximum, the half width at half maximum or the pulse width at which the pulse waveform peak value becomes a value of 1/e (where e is an exponential function).

$L_w$ is the walk-off length and is the scale for the size of cross-phase modulation. $L_{coh}$ is the coherence length and is the scale for the size of four-wave mixing at the coherence length.

Note that here coherence length $L_{coh}$ is directed to degenerate four-wave mixing. In this embodiment, the lengths $L_p, L_n$ of the two different fibers have values sufficiently smaller than $$\sqrt{L_{D2p}L_{NL}} \text{ and } \sqrt{L_{D2n}L_{NL}}$$

respectively, for example, fiber lengths $L_p, L_n$ are set to ½ or less than the value expressed by this equation. As a result, it becomes possible to avoid the deterioration in the signal waveform due to second order dispersion and optical fiber nonlinearity which occur in these intervals (see Journal of Lightwave Technology, Vol. 13, No. 5, p. 862, 7520 1995, for example).

In FIG. 1, two types of optical fibers are disposed in a single unit transmission path. Clearly, however, it is acceptable for the respective optical fibers to be disposed straddling the repeater interval provided that the aforementioned conditions are satisfied.

Next, the cross-phase modulation effect and the four-wave mixing effect are reduced by allowing the average second order dispersion value $D_{2S}$ in the interval in which the two different types of fibers are combined to remain $D_{2S}$ as a finite value, and not zero. However, deterioration occurs caused by the second order dispersion value $D_{2S}$ and optical fiber non-linearity. Thus, compensation is performed so that the second order dispersion and third order dispersion over a given distance $L_S$ becomes zero or a sufficiently small value.

For the same reasons as described above, $L_S$ at this time must be sufficiently smaller than $$\sqrt{L_{D2s}L_{NL}}$$

At the same time, in order to avoid a deterioration in the signal waveform due to fiber nonlinearity and third order dispersion $D_{3s}$, a given distance $L_s$ must be sufficiently smaller with respect to $$3\sqrt{L_{D3s}L^2_{NL}}$$

Typically, since $$\sqrt{L_{D3s}L_{NL}} > 3\sqrt{L_{D3s}L^2_{NL}}$$

there is no problem if $$L_s > \sqrt{L_{D2s}L_{NL}}$$

Moreover, in order to sufficiently reduce the cross-phase modulation effect and four-wave mixing effect, it is necessary that a given distance $L_s$ be sufficiently greater than the walk-off length $L_W$.

Since $L_{coh} < L_w$ under ordinary conditions, it is acceptable to set a given distance $L_S$ to be a value greater (5-fold greater, for example) than the walk-off length $L_W$ (see The Institute of Electronics, Information and Communications Engineers, Optical Communications System Research Committee, OCS 96–57, p. 37, 1996).

In order to render the second order dispersion and third order dispersion within the range of a given distance $L_S$ to be zero, it is necessary that the following conditions be satisfied.

$$\sum_{i=1}^{N} D_{2p}^{(i)} L_p^{(i)} + \sum_{j=1}^{M} D_{2n}^{(j)} L_n^{(j)} = 0 \quad (6)$$

$$\sum_{i=1}^{N} D_{3p}^{(i)} L_p^{(i)} + \sum_{j=1}^{M} D_{3n}^{(j)} L_n^{(j)} = 0 \quad (7)$$

Where, $$\sum_{i=1}^{N} L_p^{(i)} + \sum_{j=1}^{M} L_n^{(j)} = L_s \quad (8)$$

i and j respectively indicate the numbers of the positive dispersion fiber and the negative dispersion fiber within the interval of a given distance $L_S$. N and M each indicate the total number of fibers within the interval of a given distance $L_S$.

In the example shown in FIG. 1, positive dispersion fibers 46,52 are disposed to the respective output sides of optical amplifiers 44,50. However, this arrangement assumes that positive dispersion fibers 46,52 have a smaller nonlinear coefficient than negative dispersion fibers 42,48, and takes into consideration the impact from the effect of fiber nonlinearity.

If negative dispersion fibers 42,48 have a smaller nonlinear coefficient than positive dispersion fibers 46,52, or when the fibers are arranged to the optical amplifier output side irrespective of the size of the nonlinear coefficient, it is clear that there is no change in the contents described above.

The system in its entirety according to this embodiment is constructed by repeating the dispersion arrangement within a given distance $L_S$.

Figure 2:
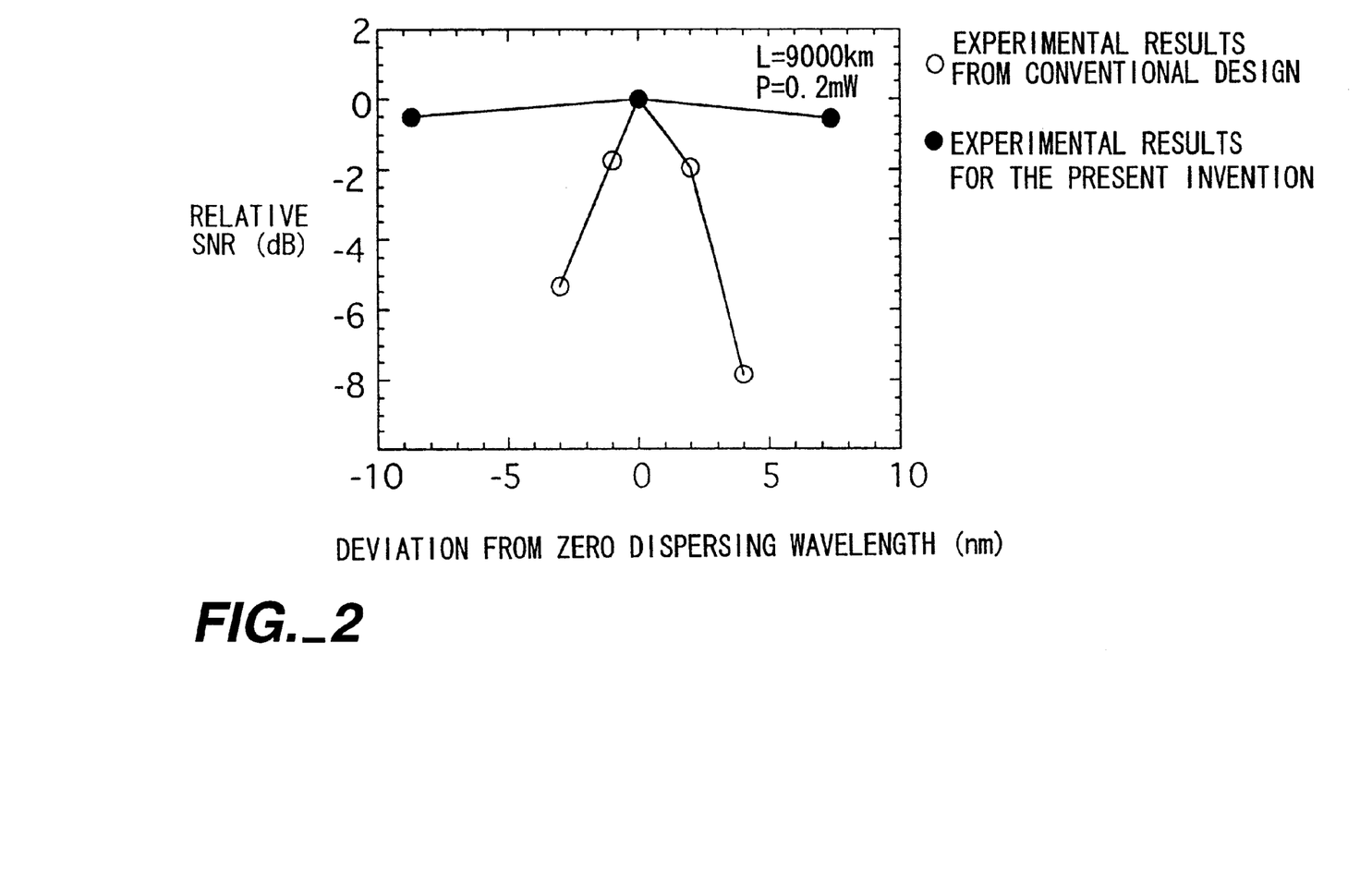
FIG. 2 is a diagram showing the experimental results for the relative signal-to-noise ratio with respect to the wavelength in the optical transmission system according to one embodiment of the present invention, and experimental results for the relative signal-to-noise ratio with respect to the wavelength in a conventional optical transmission system.

FIG. 2 is a diagram showing the experimental results for the relative signal-to-noise ratio with respect to the wavelength in the optical transmission system according to one embodiment of the present invention, and experimental results for the relative signal-to-noise ratio with respect to the wavelength in a conventional optical transmission system.

In these experimental results, a 10 Gb/s NRZ (non-return-to-zero) signal (pulse width 100 ps) of a single wavelength was output from the transmitting device 10 shown in FIG. 1, and transmitted by disposing the optical amplifiers 44,50 at approximately 50 km intervals. Note that the pulse power was 0.2 mW, and the entire length of the transmission path was 9000 km.

As a conventional optical transmission system for comparative purposes, the second and third order dispersion values of the transmission fiber 30 shown in FIG. 7 were set to −1 Ps/nm/km and 0.07 Ps/nm²/km, respectively, and a dispersion compensating fiber 38 was inserted in which the second order dispersion becomes zero at every 500 km transmission.

By combining positive dispersion fibers 40,46,52, and 54 and negative dispersion fibers 42 and 48 in the design according to an embodiment of the present invention, the third dispersing value was reduced to 0.01 Ps/nm²/km.

Due to deviation in the signal wavelength from a zero dispersion wavelength, an accumulation of second order dispersion occurs that is caused by the fact that the third order dispersion is not zero, as was explained using FIG. 8.

As a result, as shown in FIG. 2, in the conventional optical transmission system, notable SNR deterioration occurs as compared to a zero dispersion wavelength transmission. In the present invention, however, it is clear that there is an improvement in this type of deterioration over a broad wavelength region.

Figure 3:
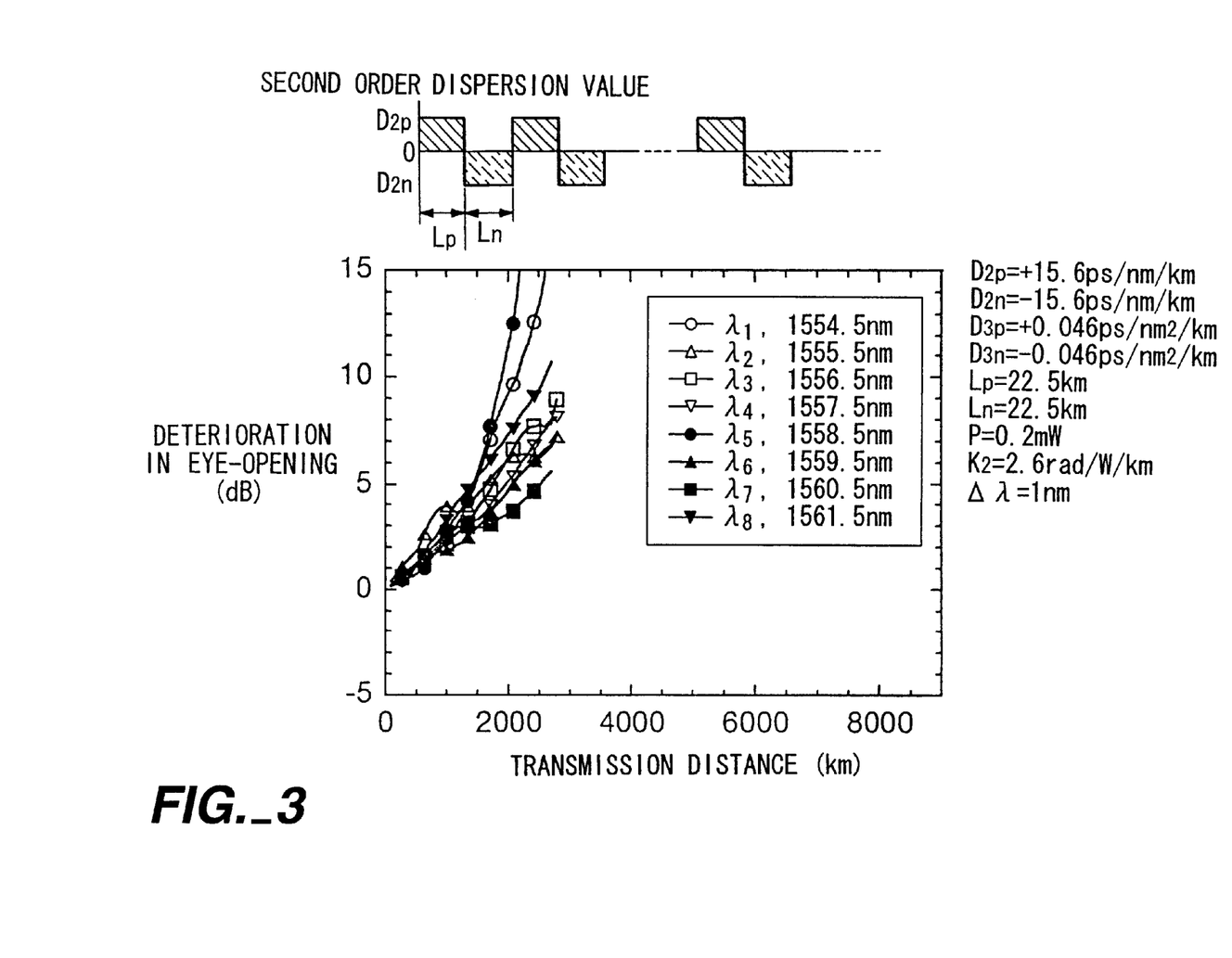
FIG. 3 is a diagram showing an example of the calculated results for transmission characteristics in the case where, in a two-type optical fiber combination method, the optical fibers have been simply combined so that the second and third order dispersions become zero in each combination of the fibers.

FIG. 3 is a diagram showing an example of the calculated results for transmission characteristics in the case where, in a two-type optical fiber combination method, the optical fibers have been simply combined so that the second and third order dispersions become zero.

Figure 4:
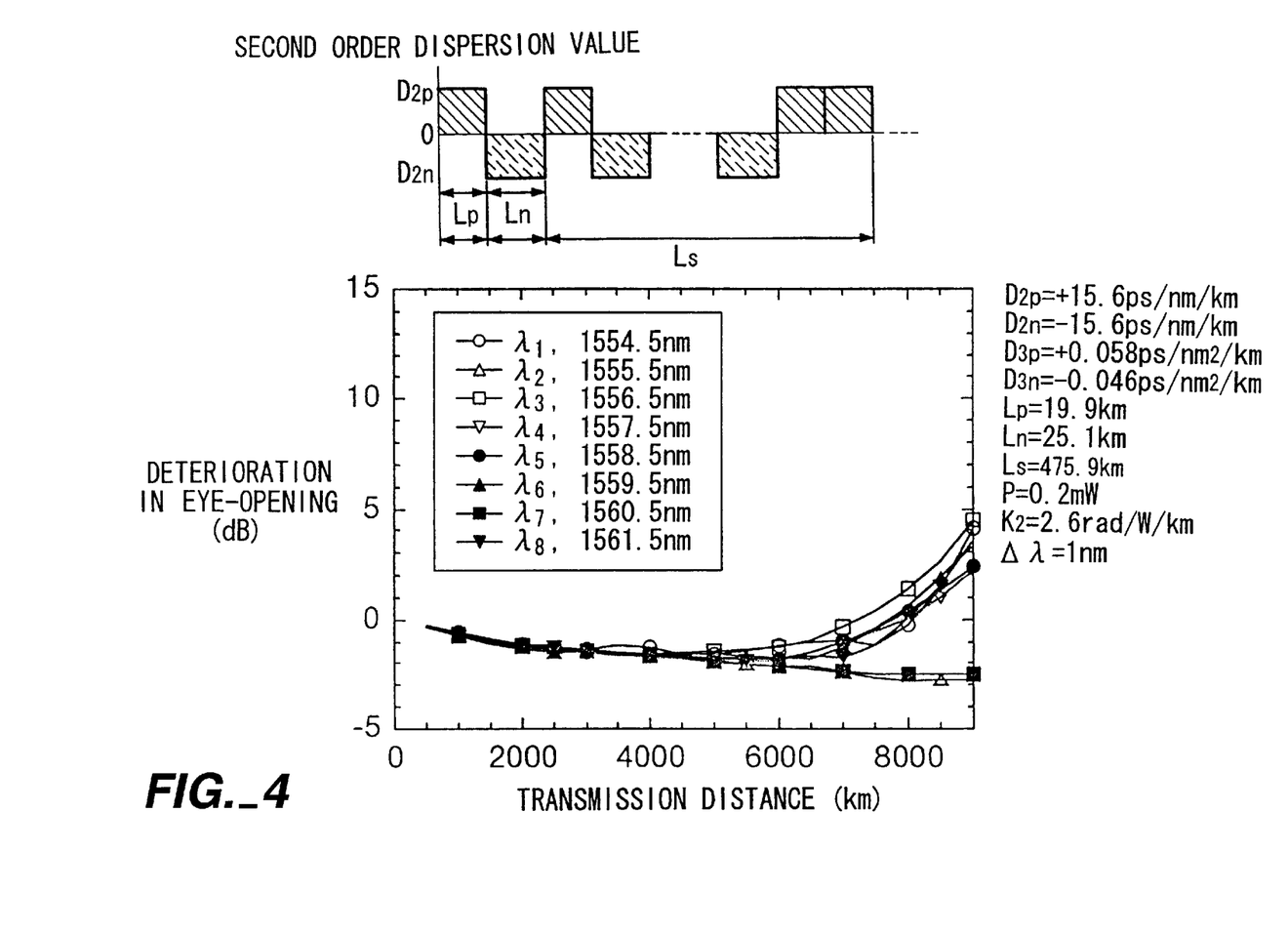
FIG. 4 is a diagram showing the calculated results for transmission characteristics in an optical transmission system according to one embodiment of the present invention.

FIG. 4 is a diagram showing the calculated results for transmission characteristics in an optical transmission system according to one embodiment of the present invention.

In FIG. 3, the average second order dispersion value $D_{2S}$ in the interval in which the two different types of fibers are combined is simply set to zero. In FIG. 4, the average second order dispersion value $D_{2S}$ remains as a finite value.

For typical parameters in the calculations, a 10 Gb/s NRZ (pulse width 100 ps) signal, signal wavelength number of 8 waves, wavelength interval of 1 nm, and average signal power within the fiber per wavelength of 0.2 mW were employed. As shown in FIG. 3, when the average second order dispersion value $D_{2S}$ was simply set to zero, notable deterioration in the eye-opening of the signal waveform occurred. As shown in FIG. 4, however, it is clear that employment of the present embodiment notably improved this deterioration.

A preferred embodiment of the present invention was explained above. Next, the situation wherein the present invention is employed in an actual optical transmission system will be explained specifically.

In the optical transmission cable which is employed in an actual optical transmission system, it has the optical fiber for the forward line and the optical fiber for the reverse line forming a pair. In addition, the optical transmission cable is typically formed by providing a plurality of these optical fiber pairs.

As in the embodiment of the present invention described above, when forming an optical transmission path of two different types of optical fiber, positive and negative dispersion fiber are required for both the forward and the reverse lines. Thus, when considering an optical transmission path consisting of one forward line and one reverse line, four combinations are required for the combination of the optical transmission cables forming the optical transmission path. In other words, the four combination are an optical transmission cable formed of positive dispersion fibers for both the forward and reverse lines; an optical transmission cable in which the forward line is a positive dispersion fiber and the reverse line is a negative dispersion fiber; an optical transmission cable in which the forward line is a negative dispersion fiber and the reverse line is a positive dispersion fiber; and an optical transmission cable formed of negative dispersion fibers for both the forward and reverse lines. However, clearly an interchange can be accomplished when using fibers of different signs for the forward and reverse lines simply by reversing the direction of connection of the optical transmission cables. Thus, in actuality, the above-described four types of optical transmission cables may be completed with only three types of optical transmission cables.

However, the construction of an optical transmission path in the repeater interval by combining of these three types of cables in a plurality of ways as necessary brings complexity to the construction and maintenance of the facility.

Accordingly, another embodiment of the present invention will now be described which resolves this problem.

As in the case of the embodiment described above, the optical transmission system according to this embodiment is comprised of a transmitting device which outputs a signal of a single wavelength or of multiplexed wavelengths; a transmission path, which is formed of a repetition of an optical transmission path for sending the signal output from the transmitting device and a repeater for amplifying the output of signals damped by loss along the optical transmission path; and a receiving device for receiving the signal sent by the transmission path.

Figure 5:
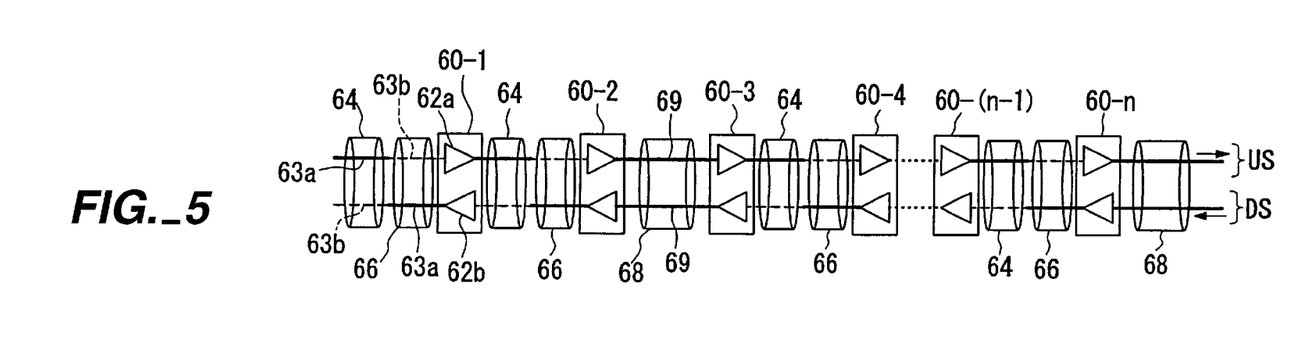
FIG. 5 is a block diagram showing the structure in overview of a transmission path in an optical transmission system according to another embodiment of the present invention.

FIG. 5 is a block diagram showing the structure in overview of the transmission path in the optical transmission system according to another embodiment of the present invention. FIG. 5 shows an example of a transmission path consisting of one forward line US and one reverse line DS.

In FIG. 5, 60-1~60-n indicates repeater for amplifying the power of the signal damped by loss along the optical transmission path. Repeater 60-1~60-n are provided with respective optical amplifiers 62a,62b for amplifying the optical signals which are propagating along the forward line US and reverse line DS. The numeral 64 consists of a positive dispersion fiber 63a having second and third positive dispersion, and a negative dispersion fiber 63b having second and third negative dispersion. In this embodiment, the lengths of positive dispersion fiber 63a and negative dispersion fiber 63b are designed to be equivalent.

Similar to optical transmission path 64, the numeral 66 indicates an optical transmission path having a positive dispersion fiber 63a having second and third positive dispersion, and a negative dispersion fiber 63b having second and third negative dispersion. Optical transmission paths 64,66 differ in that positive dispersion fiber 63a is disposed to the forward line US and negative dispersion fiber 63b is disposed to the reverse line DS in optical transmission path 64, while this arrangement is reversed in optical transmission path 66.

As shown in FIG. 5, the transmission path in the optical transmission system according to this embodiment is basically formed by repeatedly disposing as units, optical transmission path 64, optical transmission path 66, and repeater 60 (the following explanation will be made using repeaters 60 when there is no discrimination made between repeaters 60-1~60-n).

In this embodiment, intervals are provided at sites along the transmission path for compensating for second and third order dispersion accumulation in the optical signal which has propagated along the transmission path. Optical transmission path 68 is provided to these intervals. The same type of optical fibers 69 of equal length are disposed to the forward line US and reverse line DS in optical transmission path 68.

Optical transmission paths 64 and 66 have completely the same structure, so that the same type of fiber may be employed provided the connection is changed. Thus, while a discrimination is made between optical transmission paths 64,66 in FIG. 5, in actuality a transmission path may be formed using only one type of optical transmission path 62 in each repeater interval. Accordingly, this embodiment is designed so that the lengths of optical fibers 63a,63b are equal in each repeater interval which is formed of two different types of optical fibers 63a,63b having mutually opposite dispersion signs. For this reason, it is possible to form a transmission path using only one type of optical transmission path 62 in this interval. Thus, it is possible for the entire transmission path to be formed using only one type of optical transmission path 62. In addition, an optical transmission path 68 consisting of equal length optical fibers 69 in which the forward line US and the reverse line DS are of the same type is disposed at sites along the transmission path in the intervals for compensating for the accumulation of second and third order dispersion in the optical signal which has propagated along the transmission path. For this reason, it is not necessary to use various types of cables, thus construction and maintenance is facilitated.

Damage to the communications line due to severing of an undersea cable or the like is typically a serious problem in an undersea transmission system. This type of severing accident is primarily due to human error. Accordingly, the majority of these accidents occur in shallow ocean areas. Typically,.water depth increases as one moves away from the coast. Thus, it may be viewed that this type of damage occurs to the portion of the system near the terminals, i.e., within an interval of 100 km from either station.

Figure 6:
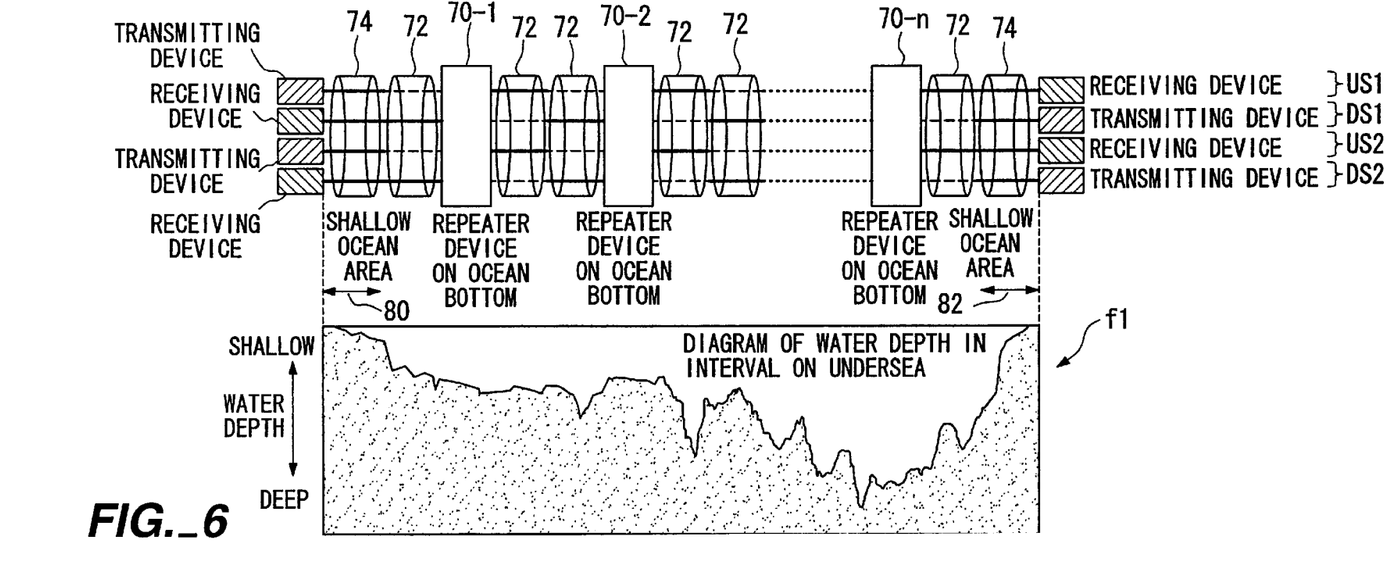
FIG. 6 is a diagram showing a modification according to another embodiment of the present invention which takes into consideration damage to a portion of the facility in shallow seas.

FIG. 6 is a diagram showing a modification according to another embodiment of the present invention in which damage in a shallow ocean area is considered.

In FIG. 6, the area indicated by symbol f1 is a diagram showing an example of the water depth in an interval along the undersea. As shown in this figure, the water depth is shallow at 80,82, and increases with greater distance from the shore.

FIG. 6 shows the case where the transmission path consists of a total of 4 lines, i.e., forward line US1,US2 and reverse lines DS1,DS2. In this embodiment, an optical transmission path 72 is employed which has two each of roughly equal length positive dispersion fiber 63a and negative dispersion fiber 63b shown in FIG. 5. As in FIG. 5, in this embodiment, the transmission path is formed employing as units two optical transmission paths 72,72 and undersea repeater 70. These two transmission paths are connected in mutually opposite directions as in the case shown in FIG. 5. This embodiment is characterized in that shallow ocean areas 80,82 are provided with an optical transmission path consisting of optical fiber in which the forward and reverse lines are of the same type. In the example shown in FIG. 6, optical transmission paths 74,74 are disposed to shallow ocean areas 80,82 having equal length optical fibers which have second and third positive dispersion for all the forward lines US1,US2 and the reverse lines DS1,DS2. The length of the optical fiber having optical transmission path 74 is preferably 20 kilometers or more in view of the distance of the shallow ocean area.

By employing this type of structure, only a single type of cable is employed for the cable used for maintenance when a malfunction occurs in shallow ocean areas 80,82. In addition, since optical transmission paths 74,74 are formed of only one type of optical fiber, the connection operation is easy.

The preceding explained another embodiment of the present invention. This embodiment was fundamentally based on the first embodiment described above.

The first embodiment described above was based on the disposition of an optical fiber such that the length of the optical fiber is sufficiently smaller than the square root of the product of the second order dispersion length, which is determined from the second order dispersion value of the optical fiber and the pulse width of the signal, and the non-linear length, which is determined from the average power of the signal within the optical fiber and the optical fiber nonlinear coefficient. However, in the modification according to the other embodiment described above, the length of the optical fiber which is employed in the shallow ocean area of the forward and reverse lines was limited. Thus, at first glance, the modification according to this other embodiment appears to contradict the first embodiment. However, the length of an undersea cable is typically in the range of several hundred to several thousand kilometers. Since the length of the shallow ocean area is 20~100 km, employing optical transmission path 74 in the shallow ocean area enables this effect to be of an order which may be ignored, even when the conditions in the first embodiment are not satisfied locally.

The preceding was an explanation of another embodiment of the present invention. The present invention is not limited to the preceding first embodiment, other embodiment or modifications, however, but may be freely changed as permitted by the scope of the invention. For example, FIGS. 5 and 6 show examples in which the number of forward and reverse lines are from 1 to 2, however the present invention is of course not limited by the line number.

What is claimed:

1. An optical transmission system characterized in
    the provision of an optical fiber transmission path in which optical fibers which have at least second and third order dispersion of mutually opposite signs are combined, and in that
    the optical fibers are disposed so that the average third order dispersion value on the transmission path overall is reduced, and so the length of each optical fiber is sufficiently smaller than the square root of the product of the second order dispersion length, which is determined from the second order dispersion value of the optical fiber and the pulse width of the signal, and the non-linear length, which is determined from the average power of the signal within the optical fiber and the optical fiber nonlinear coefficient.

2. An optical transmission system according to claim 1, characterized in that
    the average second order dispersion value on the optical fiber transmission path maintains a finite value in an interval of a distance which is sufficiently longer than the coherence length and the walk-off length, which are determined from the average second order dispersion value, the signal pulse width and the wavelength interval between each signal in a signal of multiplexed wavelengths, and in that
    the optical fiber is disposed so that the average second order dispersion value becomes zero in the interval which is smaller than the square root of the product of the second order dispersion length determined by the second order dispersion value and the signal pulse width, and the non-linear length which is determined from the average power of the signal within the optical fiber and the nonlinear coefficient of the optical fiber.

3. An optical transmission system according to claim 2, characterized in the provision of an optical amplifier which operates as an optical repeater, and in that, in the combination of optical fibers, an optical fiber with a small nonlinear coefficient is disposed to the output side of the optical amplifier.

4. An optical transmission system according to claim 1, characterized in the provision of an optical amplifier which operates as an optical repeater, and in that, in the combination of optical fibers, an optical fiber with a small nonlinear coefficient is disposed to the output side of the optical amplifier.

5. An optical transmission system according to claim 4, characterized in that the length of the optical fiber having positive sign second and third order dispersion, and the length of the optical fiber having the negative sign second and third order dispersion are equal.

6. An optical transmission system according to claim 1, characterized in that the length of the optical fiber having positive sign second and third order dispersion, and the length of the optical fiber having the negative sign second and third order dispersion are equal.

7. An optical transmission system according to claim 6, characterized in that the transmission path has forward and reverse lines, and is provided with a common interval in which the second order dispersion value with respect to the forward line and the reverse line is compensated for to be zero.

8. An optical transmission system according to claim 1, characterized in that the transmission path has forward and reverse lines, and is provided with a common interval in which the second order dispersion value with respect to the forward line and the reverse line is compensated for to be zero.

9. An optical transmission system according to claim 8, characterized in that the optical fibers at either end of the transmission path are at least 20 kilometers or greater in length and in that the forward and the reverse lines are the same type of optical fiber.

10. An optical transmission system according to claim 1, characterized in that the optical fibers at either end of the transmission path are at least 20 kilometers or greater in length and in that the forward and the reverse lines are the same type of optical fiber.

* * * * *

UNITED STATES PATENT AND TRADEMARK OFFICE
CERTIFICATE OF CORRECTION

PATENT NO. : 6,307,985 B1
DATED : October 23, 2001
INVENTOR(S) : Murakami et al.

It is certified that error appears in the above-identified patent and that said Letters Patent is hereby corrected as shown below:

Title page,
Item [73], Assignee is -- Nippon Telegraph and Telephone Corporation, Tokyo, Japan --.

Signed and Sealed this

Twenty-third Day of April, 2002

Attest:

*Attesting Officer*

JAMES E. ROGAN
*Director of the United States Patent and Trademark Office*